US012639975B2

(12) United States Patent
    Terry

(10) Patent No.: US 12,639,975 B2
(45) Date of Patent: May 26, 2026

(54) BIOMETRIC SCANNER FOR PROCESSING LIVE SEAFOOD HARVESTS

(71) Applicant: Seafood AI Inc., Millbrae, CA (US)

(72) Inventor: Robert Mark Terry, Millbrae, CA (US)

( * ) Notice: Subject to any disclaimer, the term of this patent is extended or adjusted under 35 U.S.C. 154(b) by 281 days.

(21) Appl. No.: 18/613,045

(22) Filed: Mar. 21, 2024

(65) Prior Publication Data

US 2024/0412551 A1      Dec. 12, 2024

Related U.S. Application Data

(60) Provisional application No. 63/453,725, filed on Mar. 21, 2023.

(51) Int. Cl.
    *G06V 40/10*      (2022.01)
    *G06N 5/04*      (2023.01)
    *G06Q 30/018*      (2023.01)
    *H04N 17/00*      (2006.01)

(52) U.S. Cl.
    CPC ............... *G06V 40/10* (2022.01); *G06N 5/04* (2013.01); *G06Q 30/018* (2013.01); *H04N 17/002* (2013.01)

(58) Field of Classification Search
    CPC ........ G06V 40/10; G06N 5/04; G06Q 30/018; H04N 17/002
    See application file for complete search history.

(56) References Cited

U.S. PATENT DOCUMENTS

| | | |
|---|---|---|
| 5,555,666 A | 9/1996 | Glatzer |
| 6,170,436 B1 | 1/2001 | Goodson et al. |
| 7,343,261 B1 | 3/2008 | Kell |
| 7,843,350 B2 | 11/2010 | Geissler et al. |
| 8,738,322 B1 | 5/2014 | Gioffre et al. |
| 8,826,863 B2 | 9/2014 | Skvorc, II |
| 8,947,262 B2 | 2/2015 | Rauscher et al. |

(Continued)

FOREIGN PATENT DOCUMENTS

| | | | | |
|---|---|---|---|---|
| CN | 115359256 A | * 11/2022 | ........... | G06V 10/764 |
| CN | 115565003 A | * 1/2023 | ........... | G06V 10/766 |

(Continued)

*Primary Examiner* — Tom Y Lu
(74) *Attorney, Agent, or Firm* — Intellent Patents LLC; Ahmed Alhafidh

(57)      ABSTRACT

A biometric scanner for processing live seafood harvests streamlines regulation compliance workflows and produces verifiable catch data that integrates with enterprise resource planning (ERP) systems. The biometric scanner captures individual images and weights of a live catch and applies an inference pipeline to the images and weights to determine one or more physical characteristics. Based on the one or more physical characteristics, the biometric scanner generates a unique fingerprint, determines compliance statuses, and generates a processing priority indicia for each individual unit of the live catch. Determining the compliance status requires factoring in all relevant certification and regulation-related policies and is intended to serve as a proxy for onboard oversight or auditing requirements. The processing priority indicia may comprise one more visual, auditory, or haptic feedback cues signaling a recommendation for how to prioritize the contents of a live harvest.

18 Claims, 6 Drawing Sheets

(56)     References Cited

U.S. PATENT DOCUMENTS

| | | | |
|---|---|---|---|
| 9,633,326 B2 | 4/2017 | Terry et al. | |
| 2010/0293831 A1 | 11/2010 | Hreinsson et al. | |
| 2013/0223693 A1 | 8/2013 | Chamberlain et al. | |
| 2014/0071167 A1 | 3/2014 | Lauenstein et al. | |
| 2014/0230308 A1 | 8/2014 | Skjold-Larsen | |
| 2017/0003160 A1 | 1/2017 | Terry | |
| 2017/0105397 A1 | 4/2017 | Terry | |
| 2021/0142052 A1* | 5/2021 | James | A01K 61/95 |
| 2022/0335721 A1* | 10/2022 | Brenner | G06V 20/50 |

FOREIGN PATENT DOCUMENTS

| | | | |
|---|---|---|---|
| EP | 0665774 A1 | 8/1995 |
| EP | 3192060 A2 | 7/2017 |
| WO | WO2003092369 A1 | 11/2003 |

* cited by examiner

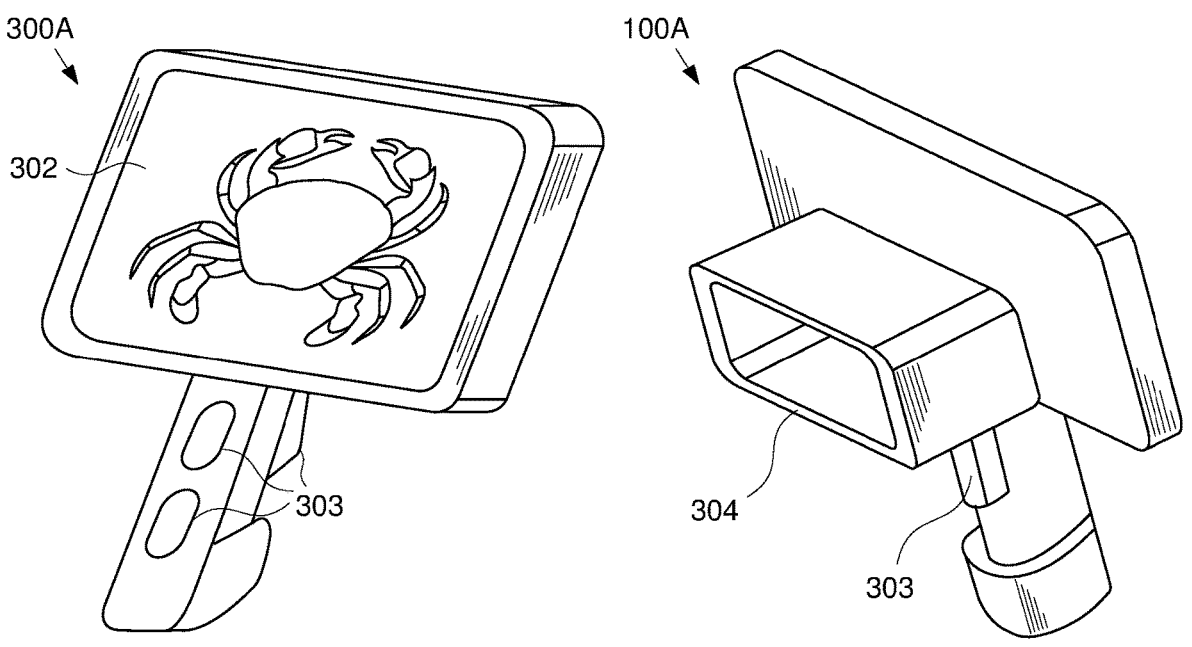
FIG. 3A
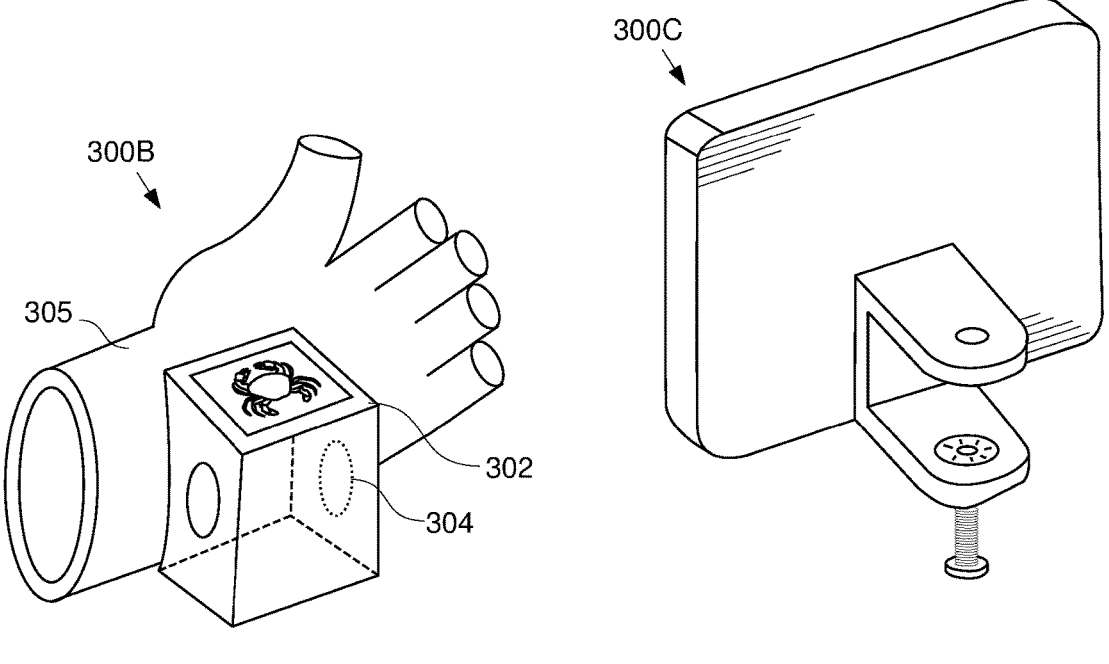
FIG. 3B          FIG. 3C

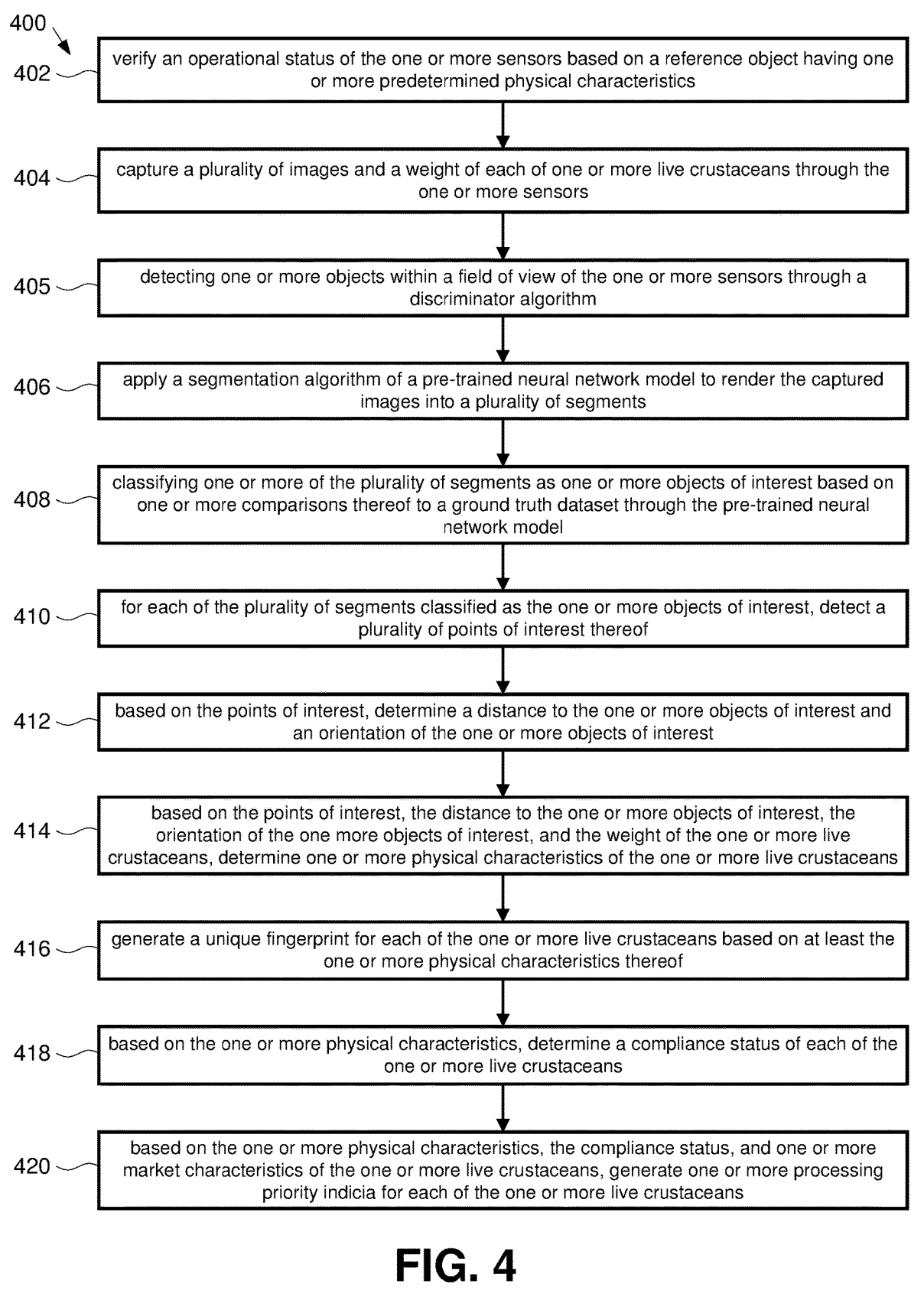

400

402 — verify an operational status of the one or more sensors based on a reference object having one or more predetermined physical characteristics 404 — capture a plurality of images and a weight of each of one or more live crustaceans through the one or more sensors 405 — detecting one or more objects within a field of view of the one or more sensors through a discriminator algorithm 406 — apply a segmentation algorithm of a pre-trained neural network model to render the captured images into a plurality of segments 408 — classifying one or more of the plurality of segments as one or more objects of interest based on one or more comparisons thereof to a ground truth dataset through the pre-trained neural network model 410 — for each of the plurality of segments classified as the one or more objects of interest, detect a plurality of points of interest thereof 412 — based on the points of interest, determine a distance to the one or more objects of interest and an orientation of the one or more objects of interest 414 — based on the points of interest, the distance to the one or more objects of interest, the orientation of the one more objects of interest, and the weight of the one or more live crustaceans, determine one or more physical characteristics of the one or more live crustaceans 416 — generate a unique fingerprint for each of the one or more live crustaceans based on at least the one or more physical characteristics thereof 418 — based on the one or more physical characteristics, determine a compliance status of each of the one or more live crustaceans 420 — based on the one or more physical characteristics, the compliance status, and one or more market characteristics of the one or more live crustaceans, generate one or more processing priority indicia for each of the one or more live crustaceans

FIG. 4

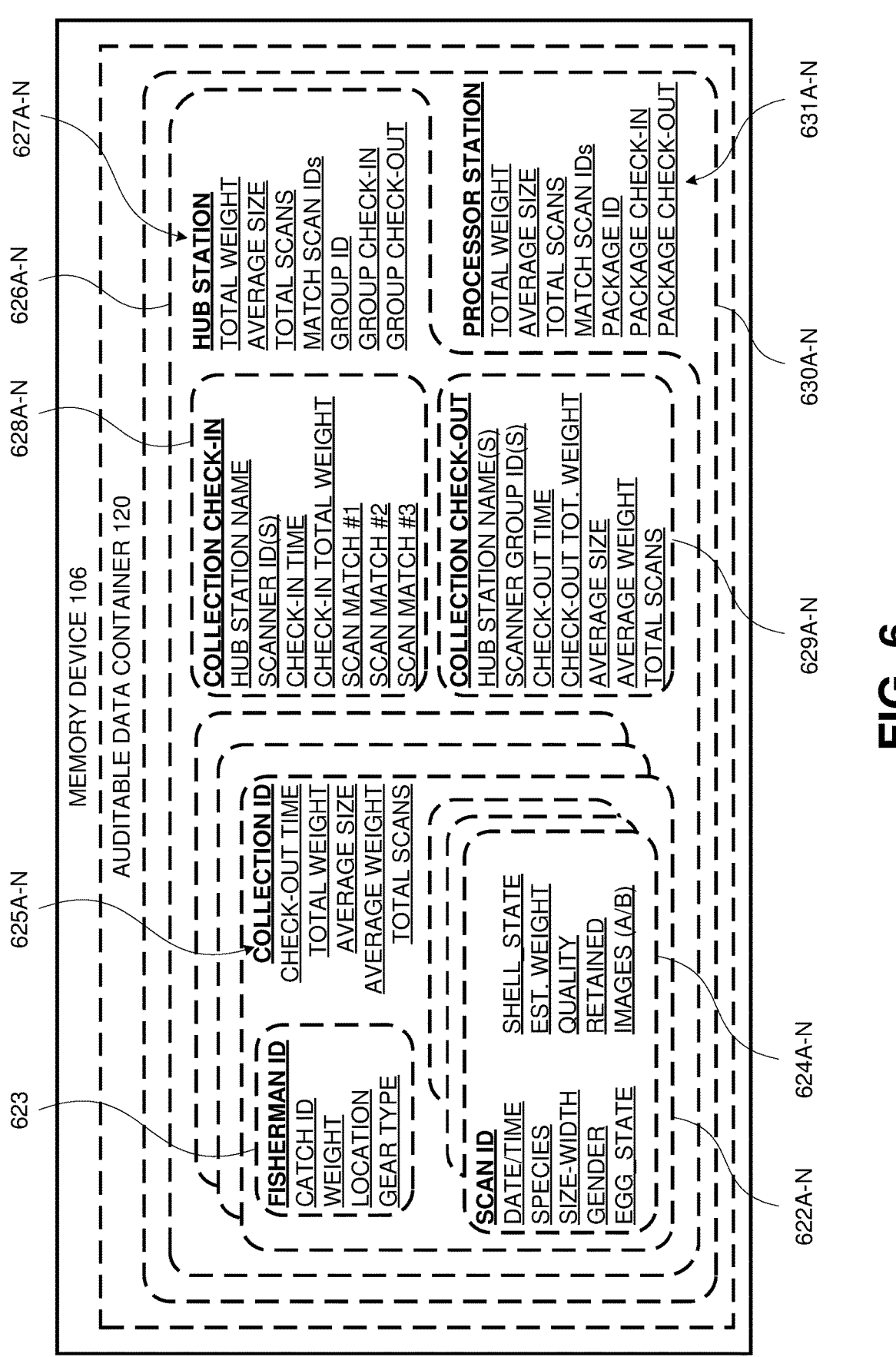

MEMORY DEVICE 106

AUDITABLE DATA CONTAINER 120

627A-N

HUB STATION
TOTAL WEIGHT
AVERAGE SIZE
TOTAL SCANS
MATCH SCAN IDs
GROUP ID
GROUP CHECK-IN
GROUP CHECK-OUT

626A-N

631A-N

PROCESSOR STATION
TOTAL WEIGHT
AVERAGE SIZE
TOTAL SCANS
MATCH SCAN IDs
PACKAGE ID
PACKAGE CHECK-IN
PACKAGE CHECK-OUT

630A-N

628A-N

COLLECTION CHECK-IN
HUB STATION NAME
SCANNER ID(S)
CHECK-IN TIME
CHECK-IN TOTAL WEIGHT
SCAN MATCH #1
SCAN MATCH #2
SCAN MATCH #3

COLLECTION CHECK-OUT
HUB STATION NAME(S)
SCANNER GROUP ID(S)
CHECK-OUT TIME
CHECK-OUT TOT. WEIGHT
AVERAGE SIZE
AVERAGE WEIGHT
TOTAL SCANS

629A-N

625A-N

COLLECTION ID
CHECK-OUT TIME
TOTAL WEIGHT
AVERAGE SIZE
AVERAGE WEIGHT
TOTAL SCANS

623

FISHERMAN ID
CATCH ID
WEIGHT
LOCATION
GEAR TYPE

SCAN ID
DATE/TIME
SPECIES
SIZE-WIDTH
GENDER
EGG_STATE

SHELL STATE
EST. WEIGHT
QUALITY
RETAINED
IMAGES (A/B)

BIOMETRIC SCANNER FOR PROCESSING LIVE SEAFOOD HARVESTS

CLAIM OF PRIORITY

This application claims priority to U.S. Provisional Application No. 63/453,725 filed Mar. 21, 2023, the entire disclosure of which is hereby expressly incorporated by reference herein.

FIELD OF TECHNOLOGY

This disclosure relates generally to portable scanners, and, more particularly, to a portable biometric seafood scanner for processing live crustacean harvests.

BACKGROUND

Crab fishery management involves managing compliance with regulatory measures, production constraints and workflow challenges, diverse chain of custody data, stock assessment requirements, and an ever-growing demand for sustainability.

Catching and processing live seafood such as crab requires experienced personnel who are able to apply a multi-factored prioritization process while sorting a live catch. The personnel are required to ensure that fishing regulation requirements are met, such as preventing bycatch or returning egg-bearing crab to their spawning locations. They are also required to understand what marketable characteristics stakeholders in the supply chain are currently looking for. Based on their catch history, they need to know which locations will yield an optimal catch during the season. They also need to know how to efficiently sort through a live harvest and determine how each individual should be prioritized based on the above factors. Currently, fishing vessel operators and onboard personnel perform this work without much technical assistance, if any. As such, there is a high degree of human error that a fishery must account for, which leads to a less marketable catch, more regulation violations, and delayed handling to distributors.

Thus, there is a need for computer-assisted post-harvest processing of live seafood without compromising common workflow routines or retrofitting existing equipment.

SUMMARY

In one or more aspects, a biometric scanner for processing live seafood harvests encompasses an apparatus and a computer program product. These aspects integrate seamlessly with existing seafood processing workflows without necessitating significant modifications to current equipment or harvesting/processing practices. The essence of the described embodiments is to streamline the post-harvest processing phase, ensuring compliance with regulatory standards and improving overall efficiency and sustainability in seafood management.

The apparatus and computer program product facilitate the efficient determination of physical characteristics, compliance status, and processing priorities of live seafood (e.g., crustaceans). This is achieved through the creation of a biometric data set that is stored within a processing device and presented to the user via an interface. The biometric scanner apparatus encompasses a processor and memory, storing instructions that enable it to perform various functions, including operational verification of sensors, image capturing through multiple CCDs, and processing of these images to identify and classify the seafood based on a pre-trained neural network model.

Moreover, these aspects utilize machine learning models to determine and classify the harvested seafood based on physical characteristics. The application of these models is based at least in part on the images captured and weight measured during the scanning process. This approach facilitates the generation of a unique fingerprint for each piece of seafood, which in turn allows for the determination of its compliance status and the assignment of processing priorities during a harvesting, collection, or processing workflow.

In a specific example embodiment, the apparatus comprises a processor and a memory. The memory contains instructions that, when executed by the processor, enable the apparatus to: verify the operational status of integrated sensors based on a reference object having one or more predetermined physical characteristics; capture a plurality of images and a weight of live crustaceans; process the plurality of images through an inference pipeline (detect objects within a field of view of the sensor(s), apply segmentation algorithms to process these images into segments and classify one or more of the segments as objects of interest; detect points of interest within the objects of interest; based on the points of interest, determine a distance to the object of interest and an orientation of the object of interest); determine physical characteristics of the live crustaceans; generate a unique fingerprint for each of the one or more live crustaceans; ascertain compliance status; and generate a processing priority indicia for each of the one or more live crustaceans based on the one or more physical characteristics, the compliance status, and one or more market characteristics of the one or more live crustaceans.

In another example embodiment, a computer program product is provided. This product includes at least one non-transitory computer-readable storage medium with computer-executable program code instructions stored therein. These instructions are designed to execute the steps mentioned previously, facilitating the same process of capturing, processing, classifying, and managing the data related to live seafood harvests through a user interface.

BRIEF DESCRIPTION OF THE DRAWINGS

The embodiments of this invention are illustrated by way of example and not limitation in the figures of the accompanying drawings, in which like references indicate similar elements and in which:

FIGS. 3A-3E are exemplary live harvest biometric scanners, according to one or more embodiments.

FIG. 4 is a process flow chart of a live harvest biometric scanning process, according to one or more embodiments.

FIG. 6 is a block diagram of the auditable data container of FIG. 1, according to one or more embodiments.

Other features of the present embodiments will be apparent from the accompanying drawings and from the detailed description that follows.

DETAILED DESCRIPTION

Described are embodiments of a biometric scanner for processing live seafood harvests, such as crab or other crustaceans/shellfish. Although references to live crustaceans may be made throughout this description, it should be understood that the embodiments apply broadly to the harvest of seafood in general. Therefore, any reference to crustaceans or other seafood types should be construed broadly, except where specified. Examples of harvesting assistance programs and functions described herein may incorporate instructions related to a specific species of type of seafood; however, it should be understood that these examples are not meant to be limiting in nature, but indicate how the biometric scanner can be configured to adaptably operate in any harvesting or regulatory environment.

The operation of the biometric scanner and components thereof are self-verifiable and any data produced therethrough may be trusted to be compliant with one or more regulations and/or standards as applicable. This allows standards/regulation compliance to be confirmed without a certifying body having to issue compliance personnel to supervise the live catch processing. Since the biometric scanner handles compliance checks in this way, the workflow involved with processing a live seafood harvest is streamlined as a result.

In addition to facilitating certification and regulatory compliance, the biometric scanner improves live harvest processing workflow. Accordingly, the biometric scanner integrates into commonly used enterprise resource planning (ERP) systems and generates high-resolution data in real-time which in turn facilitates accurate stock assessment/management and compliance status reporting. Currently, data retrieval throughout a seafood supply chain is sporadic and not easily validated—for example, fishers count crab during a live harvest, but processing centers weigh the crab and determine individual marketability. Thus, miscounts (undercounts/overcounts) are detrimental to the relationship between fisher and processor, which leads to misuse of fishing quotas or reliance on others' quotas across seasons. The biometric scanner's verifiable operational outputs provide key workflow decision indicators that a fisher, processor, and regulatory body can all have consensus over.

Figure 1:
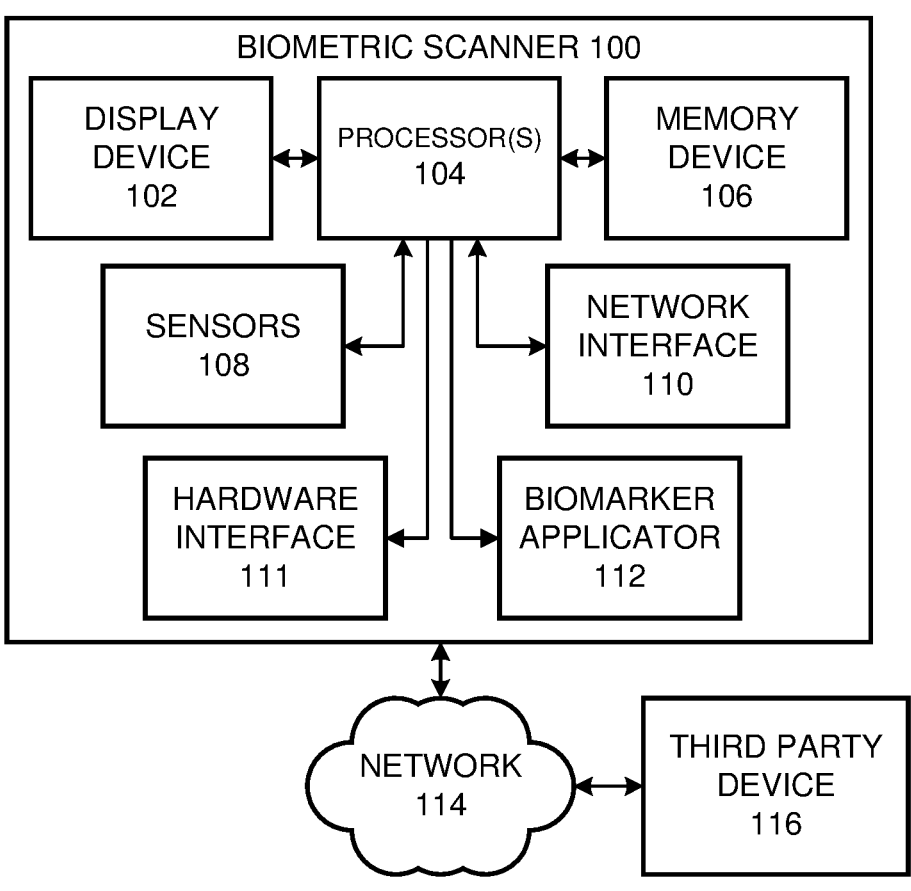
FIG. 1 is a block diagram of a biometric scanner, according to one or more embodiments.

Referring to FIG. 1, a block diagram is shown of a biometric scanner 100 and components thereof. In one embodiment, the biometric scanner 100 comprises one or more display devices 102, one or more processor(s) 104 (central processing units (CPUs), graphics processing units (GPUs), and/or neural processing units (NPUs)), one or more memory devices 106, a plurality of sensors 108, a network interface 110, a hardware interface 111, and a biomarker applicator 112.

In one or more embodiments, the display device 102 may be a liquid crystal display (LCD), a light-emitting diode (LED) display, an organic LED (OLED) display, an active-matrix OLED (AMOLED), or simply a light-emitting diode. In one embodiment, the display device 102 may be an LED that displays a single color to assist with fishery workflow. For example, the display device 102 may blink red to signal that a seafood scanned by the biometric scanner 100 should be designated for return. The memory device 106 may comprise any number of volatile and non-volatile storage devices and is communicatively coupled to the processor. The sensors 108 may comprise, in one or more examples, one or more charge-coupled devices (CCDs) configured to capture images, a global positioning system (GPS), a laser imaging, detection and ranging (LIDAR) system, an accelerometer, a weight scale, and a barometer. Other sensors that are applicable to seafood harvesting are within the scope of the embodiments described. The network interface 110 enables networked communications between the biometrics scanner 100 and, for example, third party devices 116 communicatively coupled to the biometrics scanner 100 through a network 114 (e.g., a wide area network (WAN), a local area network (LAN), Bluetooth). This allows the biometric scanner 100 to receive regulatory compliance data and operational verification protocols for onboard components (such as the display device(s) 102, the sensors 108, etc.) and relay harvested seafood data to other networked devices and/or external stakeholders. The hardware interface 111 allows peripheral devices to be connected to the biometric scanner and provides compatibility with any interconnect standard, including but not limited to USB (Universal Serial Bus), PCI (Peripheral Component Interconnect), PCIe (PCI Express), Serial IO (Serial Input/Output), GPIO (General-Purpose Input/Output), SATA (Serial ATA), HDMI (High-Definition Multimedia Interface), DisplayPort, Thunderbolt, I2C (Inter-Integrated Circuit), SPI (Serial Peripheral Interface), Ethernet, VGA (Video Graphics Array), M.2, and NVMe (Non-Volatile Memory Express). Although components of the biometric scanner 100 are shown as communicatively coupled to the processor(s) 104, it should be understood that communicative couplings may not be direct connections and may include indirect connections, such as through the hardware interface 111.

Figure 2:
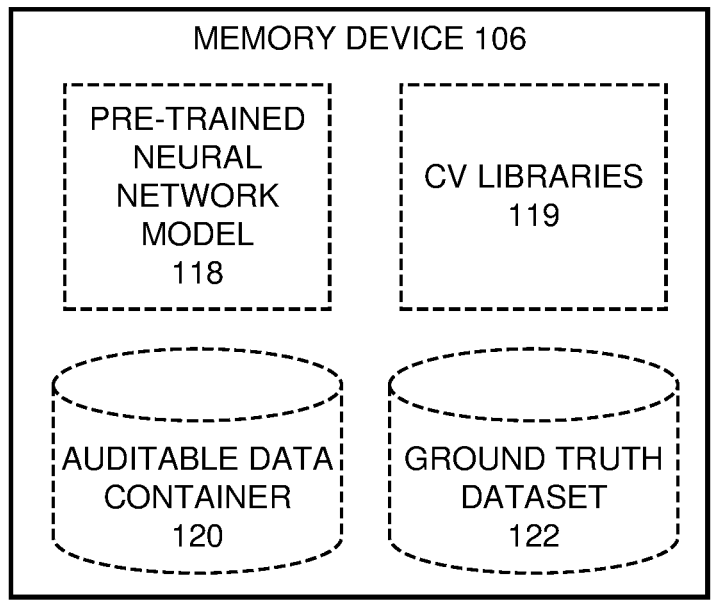
FIG. 2 is a block diagram of a memory device of the biometric scanner of FIG. 1, according to one or more embodiments.

The memory device 106 shown in FIG. 2 stores instructions executable by the processor(s) 104 and in addition, a pre-trained neural network model 118, one or more computer vision libraries 119 comprising instructions for segmenting captured images, an auditable data container 120, and a ground truth dataset 122 for classifying objects of interest within the segmented captured images. The pre-trained neural network model 118 may provide a series of algorithms which process incoming images and condense the data therein to recognize underlying physical characteristics across live crustaceans and assist in inferring individual classifications. For example, a deep-learning neural network may involve a plurality of convolutional layers, one or more pooling layers, and a fully connected layer, the output of which may be a spatial filter that not only maps out the differentiable segments of an image on a pixel-by-pixel basis but also classifies the content of the image.

In another embodiment, the pre-trained neural network model 118 may be characterized as an inference pipeline, which refers to a linear succession of one or more preprocessing, processing, and/or post-processing steps adapted to apply to a specific method of harvest or regulatory framework. The inference pipeline may be applied to sensory inputs (e.g., captured images) generated by the one or more sensors 108 and may apply a multi-phasic data analysis process. In one embodiment, the multi-phasic data analysis process of the inference pipeline may involve a first phase in which a discriminator algorithm of the inference pipeline is configured to passively scan for objects in a field of view of one or more sensors (e.g., charge-coupled devices, optical sensors). Once an object is identified within the field of view, a second segmentation phase may involve a segmentation algorithm configured to distinguish a plurality of segments of the identified object. A third phase of the inference pipeline involves a classification algorithm configured to assign a label to the individual segments and identify one or more points of interest thereof based on database information stored in the ground truth dataset 122. This generates more granular identification data of the object segments (e.g., legs, body, gender) and provides spatial orientation data which allows the object to be normalized for measurement calculations. A fourth and final phase of the inference pipeline may be a measurement of one or more physical characteristics, through one or more sensors and the inference pipeline, of the object based on analysis of one or more points of interest of the classified segments. These one or more physical characteristics include, but are not limited to: a weight of the live crustacean, a weight estimate of the live crustacean, a meat to shell ratio of the live crustacean, a gender of the live crustacean, a width dimension of the live crustacean, a length dimension of the live crustacean, a depth dimension of the live crustacean, a species of the live crustacean, a shell state of the live crustacean, an egg-bearing state of the live crustacean, and a quality score of the live crustacean. These physical characteristics are vital to differentiating between unique units of a harvest and providing the tools to check validity at different stages of handling of the harvest (i.e. harvest collection, processing, and packaging).

The auditable data container 120 may comprise aggregated data logs containing rich harvest data (e.g., facility type, facility name, time of harvest, location(s), spawning season, fishermen data, average width, total scans, total weight, total collections, number and ID of biometric scanners used) structured according to one or more data certification standards. The one or more data certification standards may provide detailed operating procedures for harvesting and processing seafood, optimal operating conditions of onboard sensors, and/or data structure requirements for optimal provenance data retrieval. An exemplary auditable data container 120 is shown in FIG. 6.

The ground truth dataset 122 may comprise a library of images of live crustaceans annotated with physical characteristics data that serve as reference points used for training a neural network. The pre-trained neural network 118 may be pre-trained using a training dataset based on the ground truth dataset 122; for example, the pre-trained neural network 118 may be specifically trained to process and analyze blue swimming crab by training the neural network using a subset of annotated blue swimming crab images. As such, the pre-trained neural network 118 may be trained to detect various physical characteristics used in determining compliance with local harvest regulations. The pre-trained neural network 118 is subsequently applied to the contents of the auditable data container 120 (in particular images of harvested seafood) and classification metadata produced therethrough is stored in the auditable data container 120 and used to generate a processing priority indicia determination which then affects the workflow of fishery or processing station operations.

The biometric scanner 100 may be communicatively coupled to one or more third-party device(s) 116 through a network 114 (e.g., a wide area network (WAN), a local area network (LAN), a virtual private network (VPN)). Relevant third-party device(s) 116 may include, but not be limited to, supply chain stakeholders (other fisheries, groups of vessels, primary processors/packers, secondary processors/canners/manufacturers, distributors/wholesalers, and retail/foodservice operations), compliance and regulatory bodies (such as the Global Sustainable Seafood Initiative (GSSI), Responsible Fisheries Management (RFM) certification, Asian Seafood Improvement Collaborative (ASIC)), and government organizations (e.g., Marine Fisheries Commission (MFC), National Oceanic and Atmospheric Administration (NOAA)).

Figures 3D, 3E:
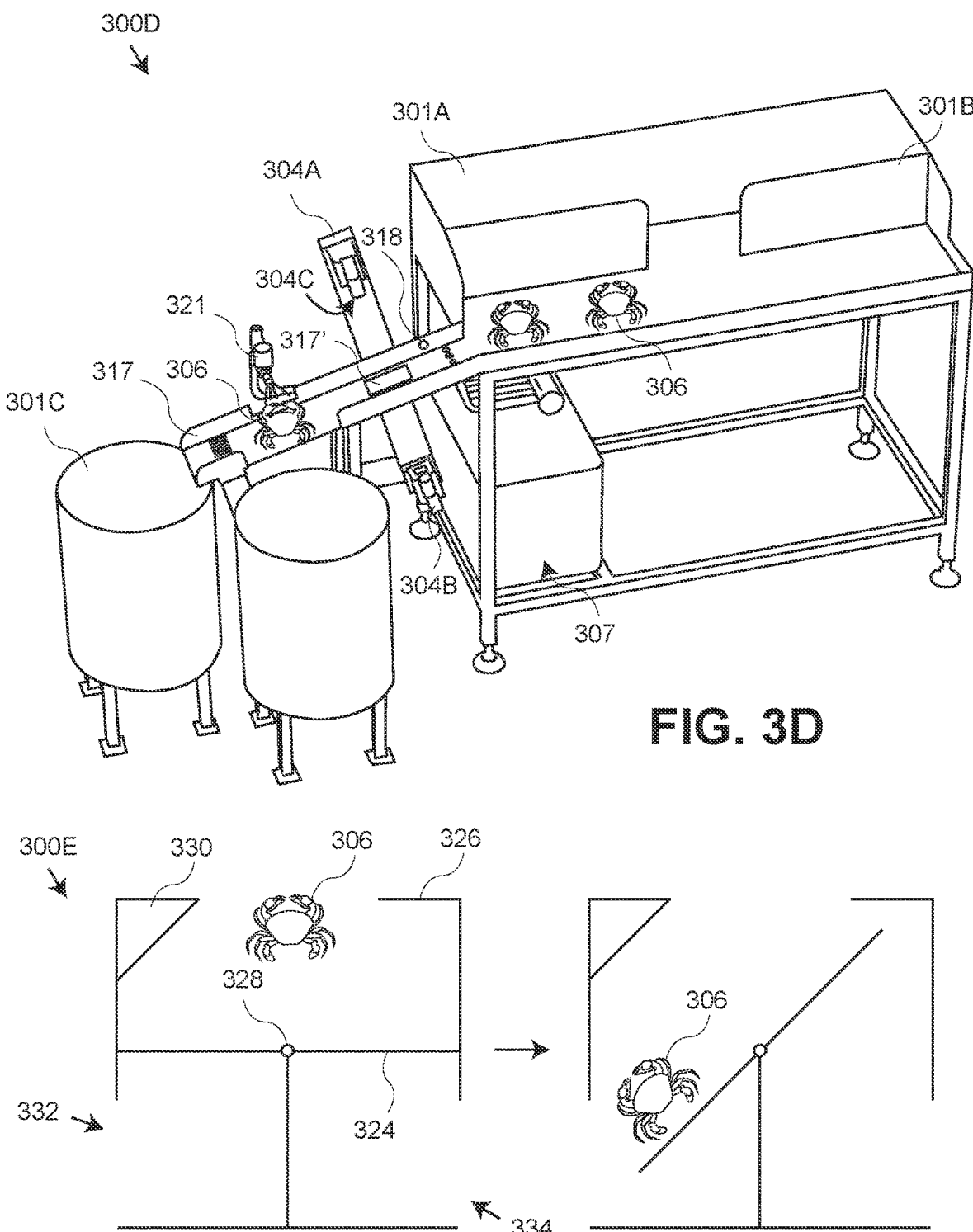

Referring to FIGS. 3A-3E, various embodiments of the biometric scanner 100 for live seafood harvest processing are shown. In one embodiment, the biometric scanner 100 may be a handheld scanner 300A such as shown in FIG. 3A, which comprises a display device 302 and one or more input interfaces 303 to actuate one or more functions of the handheld scanner 300A. The handheld scanner 300A may also comprise a CCD 304 configured to capture images. The handheld scanner 300A may provide ergonomic controls where handheld operation is ideal, such as a random compliance test of a small subset of a harvested collection. Alternate embodiments of the biometric scanner 100 may include a wearable data processing device 300B coupled to, e.g., a glove 305, as shown in FIG. 3B, or a mountable data processing device 300C as shown in FIG. 3C. In general, the biometric scanner 100 may be physically configured to integrate with the common workflow routines associated with sorting a live seafood harvest and provide ergonomic control of scanner functions.

In yet another embodiment as shown in FIG. 3D, a live harvest biometric scanner/sorter workstation 300D may comprise one or more CCDs 304A-B mounted to face a water slide 317 and specifically, a transparent portion 317' thereof. A live harvest 306 may be deposited into a staging area 301A and one or more baffles 301B may direct the live harvest 306 toward a worker at the workstation. After a manual inspection, the live harvest 306 may be individually directed toward the water slide 317. As the live harvest 306 passes down the water slide 317, the CCDs 304A-B may capture images of both sides of the harvest. A controlled lighting environment 304C may be integrated near the CCDs 304A-B, for example, in the form of a ring of LEDs surrounding the CCDs 304A-B. The controlled lighting environment 304C is configured to illuminate the live harvest 306 as it progresses through the water slide 317. A weight of the live harvest 306 may also be measured as it passes through the water slide 317. Based on the captured images and the weight of the live harvest 306, individualized analysis may be performed and before the live harvest 306 reaches the end of the water slide 317, one or more water jets 321 may be actuated to push the live harvest 306 out of the workflow before it reaches a collection bin 301C. A plurality of water jets and different collection bins may be used to separate the catch based on quality in addition to regulatory compliance. The live harvest biometric scanner/sorter workstation 300D may also comprise a water flow management system 307 which may regulate a flow of water flowing across the water slide 317. The water flow management system 307 may introduce a flow of water through one or more inlets near the top of the water slide 317 and suction water through one or more outlets near the bottom of the water slide 317. To achieve this, the water flow management system 307 may incorporate a suction means, a water storage container, a water pump, and a distribution manifold connecting the outlet(s) to the water storage, the water storage to the pump, and the pump to the inlets. The live harvest biometric scanner workstation 300D may incorporate one or more instructions in the memory device thereof and executable by the processor(s) thereof to regulate the flow of water and prevent distortion of images captured through the CCD 304B. The live harvest biometric scanner/sorter workstation 300D may also comprise one or more trigger mechanisms 318, situated near the top of the water slide 317, i.e., before the portion of the water slide 317 which the CCDs 304A-B capture images of. The trigger mechanisms 318 may incorporate an infrared (IR) or laser beam pointed at an optical sensor; when the beam is blocked by a live harvest 306 sliding down the water slide 317, the trigger mechanism 318 may actuate the CCDs 304A-B to capture images of the live harvest 306.

According to another embodiment of the biometric scanner 100, a cross section of a biometric scanner 300E incorporating a pivoting table 324 is shown in FIG. 1F. The biometric scanner 300E may comprise an enclosure 326 that secures a pivot axis 328 (extending orthogonally to the cross-section view). The pivoting table 324 may be a surface that receives a live harvest 306 and is rotatably coupled to the pivot axis 328. Rotation of the pivot axis 328 may be actuated by control components housed within a components bay 330. The components bay 330 may house other components (not shown), such as one or more sensors (e.g., one or more CCDs), one or more processors, one or more storage devices, and one or more actuators communicatively coupled to the one or more processors through a hardware interface. Based on a scanning process of the live harvest 306, the pivoting table 324 may be rotated to cause the live harvest to be accepted or rejected by, e.g., guiding the live harvest 306 toward a collection chamber 322 or a rejection chamber 324, respectively.

Referring to FIG. 4, a scanning process 400 may be shown, according to one or more embodiments. In a first step 402, the biometric scanner 100 may verify an operational status of the one or more sensors 108 and the display device 102 based on a reference object having one or more predetermined physical characteristics. In one embodiment, a verification process may involve calibrating any of the one or more sensors 108. For example, verifying the operational status of the CCD may involve capturing an image of a two-dimensional color reference card to ensure color hue is captured precisely and accurately. In another example, a three-dimensional object (e.g., a reference object having a known shape and size of a crustacean) may be used to ensure proper calibration of the LIDAR system or other sensors of the biometric scanner 100. Verifying the operational status of the LIDAR system may involve calibrating the LIDAR system according to one or more reference points at known distances or orientations relative to the biometric scanner 100. In another example, the biometric scanner 100 may comprise one or more reference points that may be used to provide physical context and make fine determinations of physical characteristics such as size and volume. These reference points may be used during the verification step to set baselines for distance measurements and orientation measurements, and physical characteristic detection. In general, this verification step ensures the validity of the data and post-processing analysis produced by the biometric scanner 100. Since this verification step is embodied in instructions performed by the biometric scanner 100 outside of the operator's influence, the biometric scanner 100 may be a trusted source of sensor data which may be relied upon by a third-party, such as an oversight or regulatory body.

To facilitate operational status verification, the biometric scanner 100 may incorporate reference material that remains static while operational status verification takes place. For example, in the live harvest biometric scanner/sorter workstation 300D embodiment of the biometric scanner 100 shown in FIG. 3D, the live harvest biometric scanner/sorter workstation 300D may comprise a slidable surface (not shown) which may incorporate the two-dimensional color reference card described above. Or, a static three-dimensional object having realistic dimensions and weight (such as a fake crab) may be used to provide one or more reference points used as physical context. Any other reference material may be used and may be specifically tuned to the parameters of a sensor or other component incorporated within the biometric scanner 100 that requires independent verification of its proper operation. In another embodiment, the reference material may be displayed through a display device embedded within the slidable surface; in this case, the reference material can be automatically updated by an authoritative party (i.e. a regulatory body). For example, digital reference material may include a series of changing shapes and colors which are used to calibrate multiple onboard components at the same time.

In a step 404, the biometric scanner 100 captures a plurality of images of one or more live crustaceans through one or more sensors 108 communicatively coupled to the one or more processors 104. Preferably, capturing multiple angles of a live crustacean is preferable in order to provide the necessary inputs to make qualitative differentiation between different live crustaceans based on the physical characteristics derived from the captured images. Multiple CCDs (at least two, preferably four) may be used to capture images from multiple angles and provide rich, multi-dimensional pixel data. Additionally, weight data may be measured through a weighing scale of the one or more sensors 108.

In steps 408-414, an inference pipeline is applied against the images and weights of each of the one or more live crustaceans to determine one or more physical characteristics thereof. Specifically, in a step 405, the biometric scanner utilizes a discriminator algorithm to detect objects within a field of view of the sensor(s) 108. In a step 406, the biometric scanner 100 executes a segmentation algorithm of a pre-trained neural network model to render the objects detected within the captured images into a plurality of segments. The segmentation algorithm produces an optimal input for subsequent live crustacean processing by reducing the amount of data in the captured images that needs to be processed. This is also an important standardization step that helps with repeatability as far as determining physical characteristics of the live seafood and/or generating a unique fingerprint of the live seafood.

In a step 408, the biometric scanner 100 classifies the plurality of segments as objects of interest based on comparing them to a ground truth dataset through the pre-trained neural network model applied to the plurality of segments. The pre-trained neural network may be trained, for example, to recognize and differentiate between annotated segments of known species of crustaceans. The ground truth dataset may comprise a library of annotated images of crustaceans that may be used to train a neural network to apply various weights to certain features of an image and observe the aggregate effect those weights have on the probability of a match with the annotated images. If no segments are classified as objects of interest during this step, the process may be interrupted. In a related embodiment, the ground truth dataset and the pre-trained neural network model may be periodically updated through feedback data generated by the biometric scanner 100. This allows retraining of the pre-training neural network model 118 according to shifting standards, different target species, different harvesting practices or changing regulatory policies.

In a step 410, for each of the plurality of segments classified as an object of interest, the biometric scanner 100 detects a plurality of points of interest thereof. The points of interest may be defining physical features that underlie more complex quantitative and qualitative determinations of physical characteristics of live crustaceans. For example, the points of interest may be the points along a carapace of a crustacean which would be used to calculate a width/length/depth dimension of the carapace. Or, for example, the points of interest may indicate a potential molting line that may be used to determine a molting stage of the live crustacean (indicating that the crustacean is still immature). Or, the points of interest may indicate an egg mass on an overgeous (egg-bearing) female crustacean; in blue swimming crab for example, the egg mass is usually a large colored area on the female abdomen that changes from orange to brown.

Figure 5:
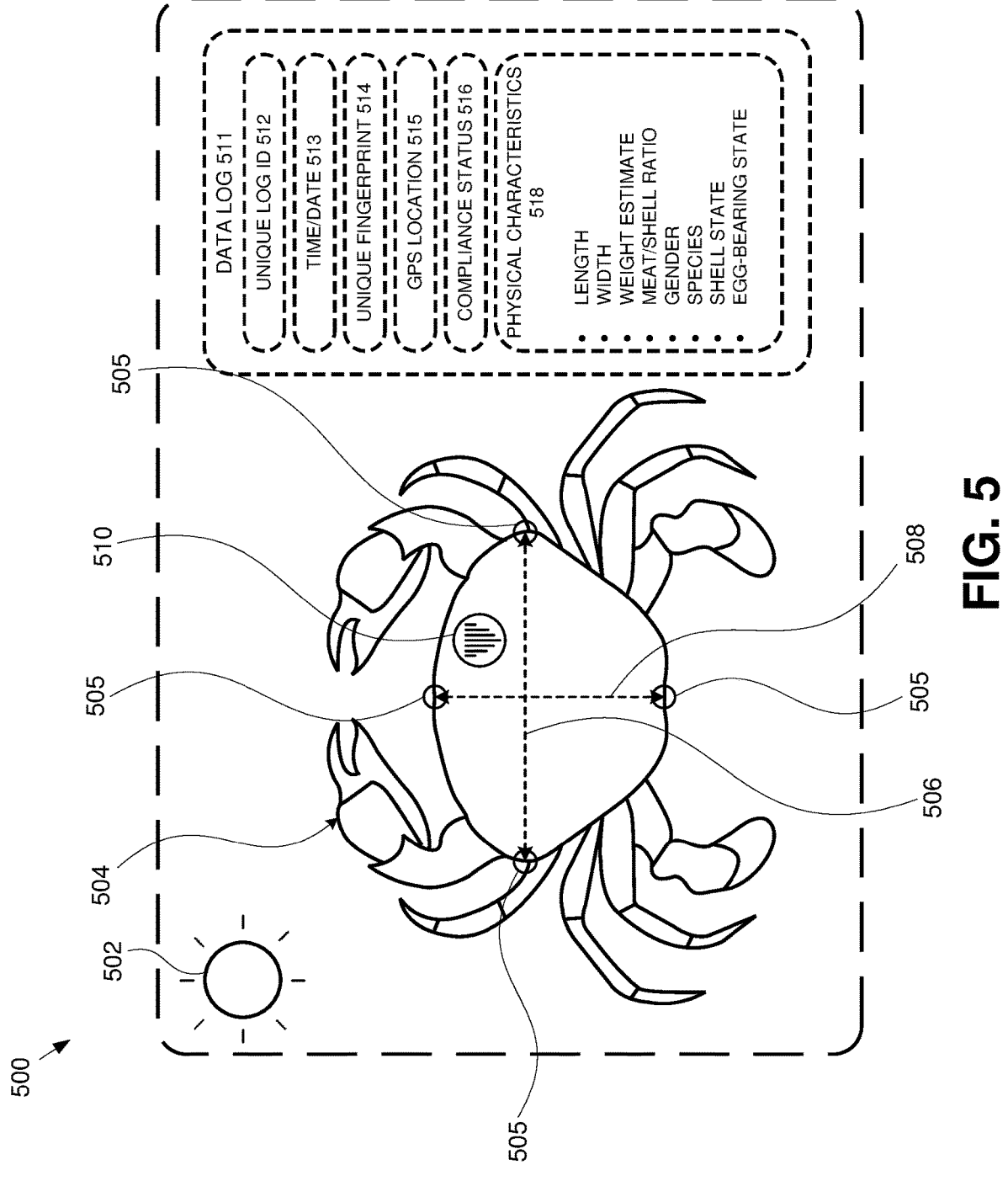
FIG. 5 is an interface view displayable through a display device of the biometric scanner of FIG. 1, according to one or more embodiments.

Referring to FIG. 5, an exemplary interface view 500 is shown. The biometric scanner 100 may display the interface view 500 through the display device 102. In one embodiment, the interface view 500 comprises one or more processing priority indicia 502. In another embodiment, the interface view 500 comprises one or more processing priority indicia 502 and a representation of a live crustacean 504 scanned through the biometric scanner 100. The interface view 500 may also display visual indicators of a width dimension 506 of the live crustacean 504 (e.g., carapace width), a length dimension 508 of the live crustacean 504, and a biomarker 510 corresponding to the unique fingerprint of the live crustacean 504. The width dimension 506 and the length dimension 508 may be derived from the points of interest 505 which may also be shown. The interface view 500 may also display a data log 511 which shows a unique log ID 512, a time and date associated with the harvest 513, a GPS location 515 of the harvest, the unique fingerprint 514 associated with the live crustacean 504, a compliance status 516, and one or more physical characteristics 518.

In a step 412, based on the points of interest, the biometric scanner 100 may determine a distance to the object of interest and an orientation of the object of interest. Using the LIDAR system, a distance to each individual live seafood 'object' defined by the segmentation algorithm may be determined. Additionally, an orientation of each of the one or more live crustaceans relative to a 2D plane orthogonal to the biometric scanner may be determined. The distance and orientation measurements allow for normalization of a plurality of segments in each captured image and are underlying factors for calculations of more complex physical characteristics. Since the biometric scanner 100 is intended to be used to capture images of more than one harvested unit in a catch and infer their individual physical characteristics, distance and orientation are primary confounding factors. Normalizing a 'view' of the live crustaceans in this way creates a valid input for further analysis.

In a step 414, the biometric scanner 100 may determine one or more physical characteristics of the one or more live crustaceans based on the plurality of points of interest, the distance to the object of interest, and the orientation of the object of interest. Numerous physical details of each live crustaceans can be calculated and tabulated, such as a weight of the harvest crustacean, a meat to shell ratio of the live crustacean, a gender of the live crustacean, a width dimension of the live crustacean, a length dimension of the live crustacean, a species of the live crustacean, a molting state of a shell of the live crustacean, a coloration of the live crustacean, an egg-bearing state of the live crustacean, and a "quality score" of the live crustacean. These unique physical characteristics allow for individual differentiation digitally, e.g., as a hash of the characteristic values, and physically in the form of a barcode, a QR code, or other machine-readable format. The quality score may be based on a scale governed by regulation policies, certification standards, and/or market considerations. The quality score may be a qualitative evaluation of the live crustacean based on comparing the one or more physical characteristics to the boundaries of the scale based on the factors thereof, such as preferable size/dimensions, preferable weight, preferable meat-to-mass ratio, age, gender, and more.

As individual live crustaceans are scanned and analyzed, the biometric scanner 416 may be involved in a further step

412, in which, for each of the live crustaceans, the biometric scanner 100 generates a unique fingerprint for each of the one or more live crustaceans based on their corresponding one or more physical characteristics. Additionally, the unique fingerprint may incorporate other identification data, such as DNA sample data. The unique fingerprint may be a machine-readable format such as a barcode or a QR code, or an alphanumeric identifier. Generating a unique fingerprint is a replicable task that accounts for physical uniqueness between live crustaceans. The unique fingerprint may be generated, for example, based on one or more values described from the one or more physical characteristics and/or one or more portions of the captured image(s) associated with the live crustacean.

In a step 418, the biometric scanner 100 determines a compliance status of each of the one or more live crustaceans. Determining the compliance status requires factoring in all certification and regulation-related policies relevant to the harvest and is intended to serve as a proxy for onboard oversight or auditing requirements, which drastically reduces the resources needed to accommodate oversight personnel. For example, the one or more physical characteristics may include egg-bearing state-a positive egg-bearing status of a live crustacean may cause the biometric scanner 100 to determine that live crustacean is not in compliance with known regulatory policies restricting fisheries from harvesting egg-bearing let alone female crustaceans. During processing, this information may be used to alert an operator to return the egg-bearing female to its corresponding spawning location which may be stored in the auditable data container 120. This allows a fishery to avoid penalties and transparently maintain sustainable fishing practices.

In a step 420, the biometric scanner 100 generates one or more processor priority indicia for each of the one or more live crustaceans according to its corresponding one or more physical characteristics, its compliance status, and one or more market characteristics. The processing priority indicia may comprise one more visual, auditory, or haptic feedback cues signaling a recommendation for how to prioritize the contents of a live harvest. The processing priority indicia is driven in part by market characteristics, which involve inputs from internal workflow practice (for example, a fishery prioritizing a certain species over others to more effectively utilize inventory/equipment or ensure fishing quota are not exceeded for a season) and external influencing factors (for example, prioritizing a certain species due to end-user demand).

Reference is made to U.S. Pat. No. 9,633,326 (hereinafter '326) titled "Load Distribution and Consolidation Tracking System and filed Jun. 10, 2015, in which a traceability system is described, the entirety of which is incorporated herewith. Summarily, the traceability system described in '326 allows individual loads and origin metadata thereof to be tracked throughout a supply chain, but also as the loads are split and/or consolidated with other loads. This way, the contents of a final package can be associated with a digital manifest that include the provenance data of all constituent loads that were consolidated. The biometric scanner achieves load distribution and consolidation tracking in a similar manner.

Referring to FIG. 6, a block diagram of the auditable data container 120 is shown. The auditable data container 120 comprises, in one or more embodiments, a database structured to support the auditing and compliance verification process for harvested seafood. The auditable data container 120 comprises comprehensive harvest data, including data related to collections 622A-N by collection stations, groups 626A-N of collections compiled and scanned at hub stations, and packages 629A-N which are compiled and scanned at processor stations. Collections 622A-N each comprise: fisherman (or fishery) data 623 generated through a biometric scanner operated by a fisherman or fishery operator, scan data 624A-N for all individually harvested units, and collection metadata 625A-N. The collections 622A-N are ultimately consolidated into groups 626A-N by one or more hub stations which generate hub station metadata 627A-N through one or more biometric scanners operated at the hub station(s). The groups 626A-N data incorporates the collections 622A-N data, check-in data 628A-N and check-out data 629A-N collected by hub stations. The groups 626A-N of collections 622A-N of seafood harvests are received by the one or more processor stations, which consolidate the groups 626A-N into packages 630A-N and generate package metadata 631A-N.

Throughout the supply chain, each individual biometric scanner used at different stages of harvesting and processing may incorporate hashed versions of the metadata that it contributed to the auditable data container 120, allowing unique fingerprints, compliance statuses and physical characteristics to be validated with minimal processing effort.

What is claimed is:

1. A data processing device, comprising:
one or more processors;
one or more memory devices communicatively coupled to the one or more processors;
one or more sensors communicatively coupled to the one or more processors;
a display device communicatively coupled to the one or more processors, wherein the one or more memory devices comprises instructions which when executed cause the data processing device to:
    verify an operational status of the one or more sensors based on a reference object having one or more predetermined physical characteristics;
    capture a plurality of images and a weight of each of one or more live crustaceans through the one or more sensors;
    for each of the one or more live crustaceans, apply an inference pipeline to the plurality of images and the weight thereof to determine one or more physical characteristics thereof;
    generate a unique fingerprint for each of the one or more live crustaceans based on at least the one or more physical characteristics thereof;
    based on the one or more physical characteristics, determine a compliance status of each of the one or more live crustaceans; and
    based on the one or more physical characteristics, the compliance status, and one or more market characteristics of the one or more live crustaceans, generate one or more processing priority indicia for each of the one or more live crustaceans.

2. The data processing device of claim 1, wherein:
the one or more physical characteristics comprise a weight of the live crustacean, a weight estimate of the live crustacean, a meat to shell ratio of the live crustacean, a gender of the live crustacean, a width dimension of the live crustacean, a length dimension of the live crustacean, a depth dimension of the live crustacean, a species of the live crustacean, a shell state of the live crustacean, an egg-bearing state of the live crustacean, a quality score of the live crustacean.

3. The data processing device of claim 1, wherein the instructions also comprise:
for each of the one or more live crustaceans:
    generate a data log comprising at least the corresponding unique fingerprint, the corresponding compliance status and the corresponding one or more physical characteristics, and
    wherein a hash of the data log is stored in the one or more memory devices.

4. The data processing device of claim 3, wherein the instructions also comprise:
aggregating the data logs of the one or more live crustaceans into an auditable data container that is independently verifiable by a third-party.

5. The data processing device of claim 1, wherein the instructions also comprise:
applying a biomarker based on the unique fingerprint to the corresponding one or more live crustacean through a biomarker applicator of the data processing device.

6. The data processing device of claim 1, wherein verifying an operational status of the one or more sensors also involves testing the one or more sensors against one or more reference objects and generating a test log comprising the results thereof.

7. A method of facilitating a seafood processing workflow performed by a processor of a data processing device which stores instructions in a memory device, the execution of which instructions causes the processor to:
verify an operational status of one or more sensors of the data processing device based on a reference object having one or more predetermined physical characteristics;
capture a plurality of images and a weight of each of one or more live crustaceans through the one or more sensors;
for each of the one or more live crustaceans, apply an inference pipeline to the plurality of images and the weight thereof to determine one or more physical characteristics thereof;
generate a unique fingerprint for each of the one or more live crustaceans based on at least the one or more physical characteristics thereof;
based on the one or more physical characteristics, determine a compliance status of each of the one or more live crustaceans; and
based on the one or more physical characteristics, the compliance status, and one or more market characteristics of the one or more live crustaceans, generate one or more processing priority indicia for each of the one or more live crustaceans.

8. The data processing device of claim 7, wherein:
the one or more physical characteristics comprise a weight of the live crustacean, a weight estimate of the live crustacean, a meat to shell ratio of the live crustacean, a gender of the live crustacean, a width dimension of the live crustacean, a length dimension of the live crustacean, a depth dimension of the live crustacean, a species of the live crustacean, a shell state of the live crustacean, an egg-bearing state of the live crustacean, and a quality score of the live crustacean.

9. The data processing device of claim 7, wherein the instructions also comprise:
for each of the one or more live crustaceans:
    generate a data log comprising the corresponding unique fingerprint, the corresponding compliance status and the corresponding one or more physical characteristics, wherein a hash of the data log is stored in the one or more memory devices.

10. The data processing device of claim 9, wherein the instructions also comprise:

aggregating the data logs of the one or more live crustacean into an auditable data container that is independently verifiable by a third-party.

11. The data processing device of claim 7, wherein the instructions also comprise:

applying a biomarker based on the unique fingerprint to the corresponding one or more live crustacean through a biomarker applicator of the data processing device.

12. The data processing device of claim 7, wherein verifying an operational status of the one or more sensors also involves testing the one or more sensors against one or more reference objects and generating a test log comprising the results thereof.

13. A seafood harvest processing and compliance system comprises:

one or more data processing devices comprising:

one or more processors;

one or more memory devices comprising instructions that when executed by the processor(s) caused the one or more data processing devices to:

verify an operational status of one or more sensors communicatively coupled to the one or more processors based on a reference object having one or more predetermined physical characteristics;

capture a plurality of images and a weight of each of one or more live crustaceans through the one or more sensors;

for each of the one or more live crustaceans, apply an inference pipeline to the plurality of images and the weight thereof to determine one or more physical characteristics thereof;

generate a unique fingerprint for each of the one or more live crustaceans based on at least the one or more physical characteristics thereof;

based on the one or more physical characteristics, determine a compliance status of each of the one or more live crustaceans; and based on the one or more physical characteristics, the compliance status, and one or more market characteristics of the one or more live crustaceans, generate one or more processing priority indicia for each of the one or more live crustaceans.

14. The data processing device of claim 13, wherein:

the one or more physical characteristics comprise a weight of the live crustacean, a weight estimate of the live crustacean, a meat to shell ratio of the live crustacean, a gender of the live crustacean, a width dimension of the live crustacean, a length dimension of the live crustacean, a depth dimension of the live crustacean, a species of the live crustacean, a shell state of the live crustacean, an egg-bearing state of the live crustacean, and a quality score of the live crustacean.

15. The data processing device of claim 13, wherein the instructions also comprise:

for each of the one or more live crustaceans:

generate a data log comprising the corresponding unique fingerprint, the corresponding compliance status and the corresponding one or more physical characteristics, wherein a hash of the data log is stored in the one or more memory devices.

16. The data processing device of claim 15, wherein the instructions also comprise:

aggregating the data logs of the one or more live crustacean into an auditable data container that is independently verifiable by a third-party.

17. The data processing device of claim 13, wherein the instructions also comprise:

applying a biomarker based on the unique fingerprint to the corresponding one or more live crustacean through a biomarker applicator of the data processing device.

18. The data processing device of claim 13, wherein verifying an operational status of the one or more sensors also involves testing the one or more sensors against one or more reference objects and generating a test log comprising the results thereof.

\* \* \* \* \*